United States Patent
Unger et al.

(10) Patent No.: US 9,876,340 B2
(45) Date of Patent: Jan. 23, 2018

(54) UTILITY ENCLOSURE HAVING ATTACHED COVER LATCHING MECHANISM

(71) Applicant: Hubbell Incorporated, Shelton, CT (US)

(72) Inventors: John Unger, Rocky Mount, NC (US); Ryan Hudlow, Rocky Mount, NC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/829,855

(22) Filed: Aug. 19, 2015

(65) Prior Publication Data

US 2016/0053521 A1 Feb. 25, 2016

Related U.S. Application Data

(60) Provisional application No. 62/040,378, filed on Aug. 21, 2014.

(51) Int. Cl.
*H02G 3/14* (2006.01)
*H02G 3/18* (2006.01)

(52) U.S. Cl.
CPC .............. *H02G 3/14* (2013.01); *H02G 3/18* (2013.01)

(58) Field of Classification Search
CPC .. H02G 3/14; H02G 3/18; H02G 3/08; H02G 3/081; H02G 3/086; H05K 5/0013; H05K 5/0008; H05K 5/03; B65D 45/02; B65D 45/16; B65D 45/24; H01R 13/447
USPC ....... 220/3.8, 4.02, 3.94, 3.2, 328, 327, 325, 220/324, 315, 242, 241; 174/563, 562, 174/561, 560, 559; 52/128; 292/80, 60, 292/163, DIG. 61
See application file for complete search history.

(56) References Cited

U.S. PATENT DOCUMENTS

| | | | | |
|---|---|---|---|---|
| 2,801,768 A | * | 8/1957 | Immel | H01H 9/043 220/88.2 |
| 2,881,940 A | * | 4/1959 | Hamilton | H02G 3/14 220/3.8 |
| 2,950,141 A | * | 8/1960 | Koff | E05B 65/006 220/245 |
| 3,029,964 A | * | 4/1962 | Hudson | H02G 3/185 138/92 |
| 3,405,834 A | * | 10/1968 | Butler | E04B 5/48 174/57 |
| 3,468,577 A | * | 9/1969 | Mazerka | E05B 65/006 220/325 |
| 3,606,064 A | * | 9/1971 | Butler | H02G 3/185 220/3.8 |
| 3,952,908 A | * | 4/1976 | Carson | H02B 1/06 220/3.8 |

(Continued)

FOREIGN PATENT DOCUMENTS

| | | | | |
|---|---|---|---|---|
| EP | 0527560 A1 | * | 2/1993 | H02G 3/14 |
| GB | 168499 A | * | 9/1921 | H02G 3/18 |

*Primary Examiner* — Robert J Hicks
(74) *Attorney, Agent, or Firm* — Wissing Miller LLP

(57) ABSTRACT

A utility enclosure assembly includes a box and a lid. The box has a plurality of side walls each having an upper ledge, a hollow center opening and at least one receiving latching mechanism associated with a ledge in at least one of the side walls. The lid rests on the ledges of the side walls and has at least one attached latching mechanism. The at least one attached latching mechanism is provided to operatively engage a respective one of the at least one receiving latching mechanism.

17 Claims, 6 Drawing Sheets

(56) References Cited

U.S. PATENT DOCUMENTS

| | | | | |
|---|---|---|---|---|
| 5,194,696 A * | 3/1993 | Read | ................... | G11B 33/1466 |
| | | | | 174/560 |
| 5,574,254 A * | 11/1996 | Mori | ...................... | H02G 3/088 |
| | | | | 174/561 |
| 5,944,210 A * | 8/1999 | Yetter | .................... | H02G 3/081 |
| | | | | 220/241 |
| 7,607,553 B2 * | 10/2009 | Weber | .................... | H02G 3/086 |
| | | | | 174/562 |
| 2004/0055231 A1* | 3/2004 | Dang | ..................... | E03B 7/095 |
| | | | | 52/128 |
| 2009/0211779 A1* | 8/2009 | Drane | ..................... | H02G 3/14 |
| | | | | 174/67 |
| 2013/0248534 A1* | 9/2013 | Dang | ..................... | B65D 50/00 |
| | | | | 220/484 |

* cited by examiner

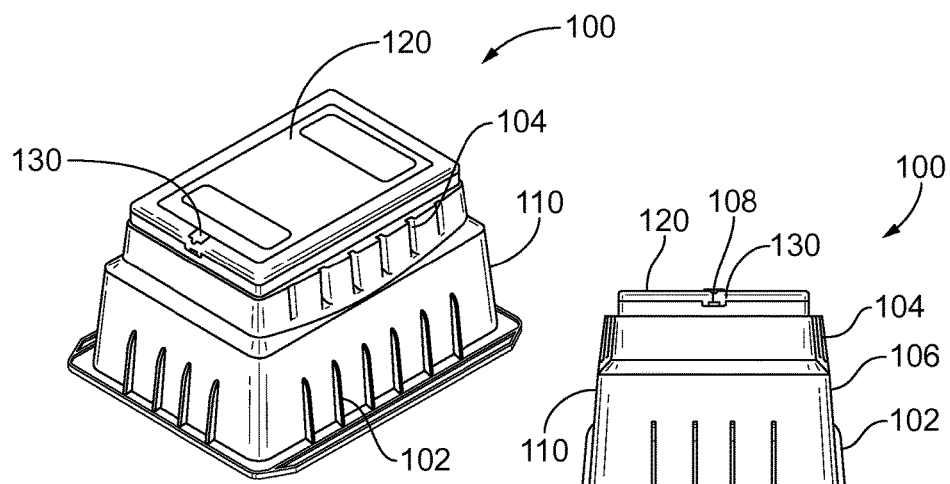
FIG. 1
FIG. 2
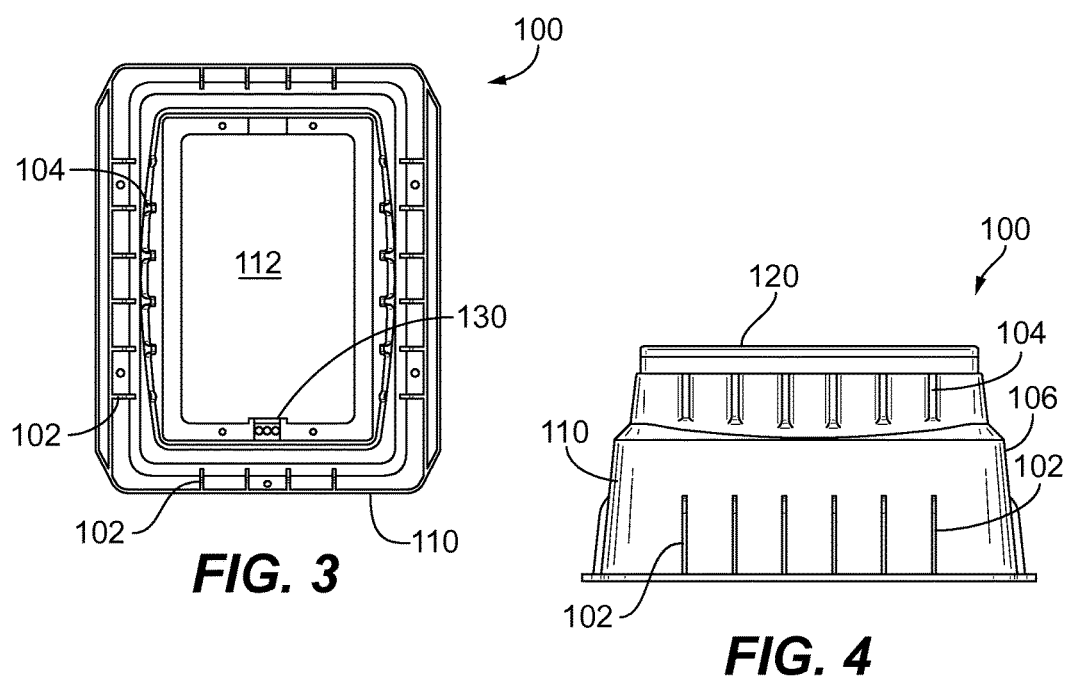
FIG. 3
FIG. 4

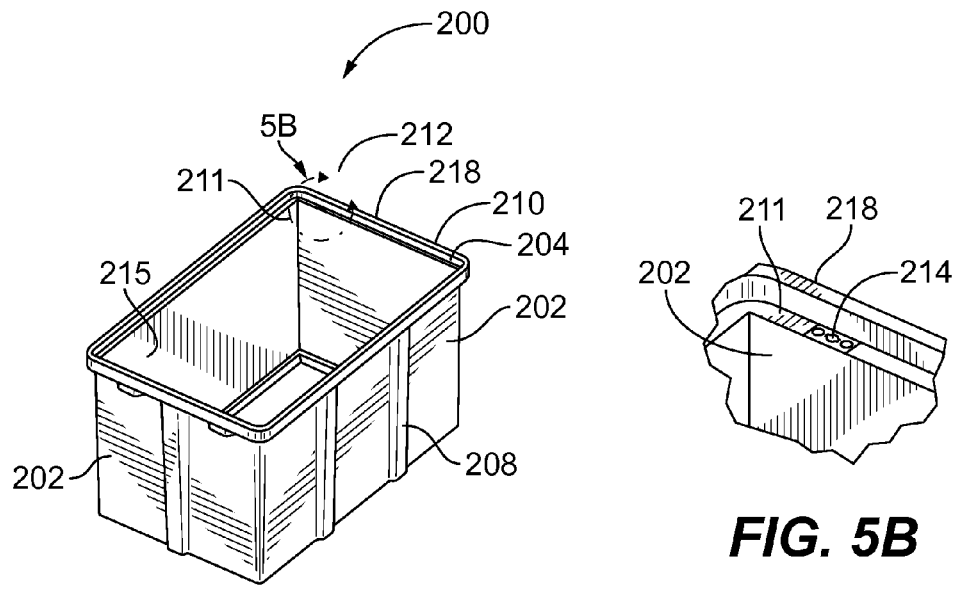
FIG. 5A
FIG. 5B
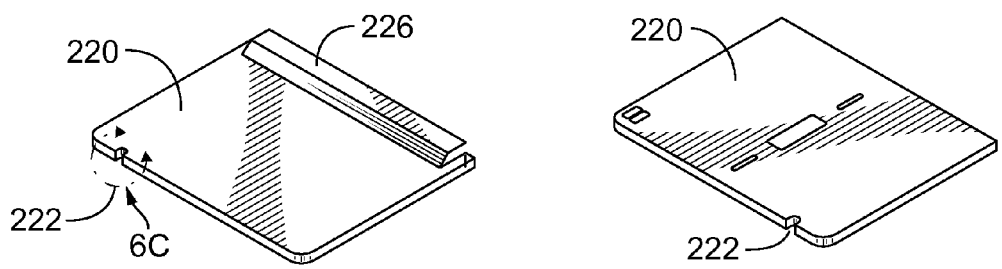
FIG. 6A   FIG. 6B
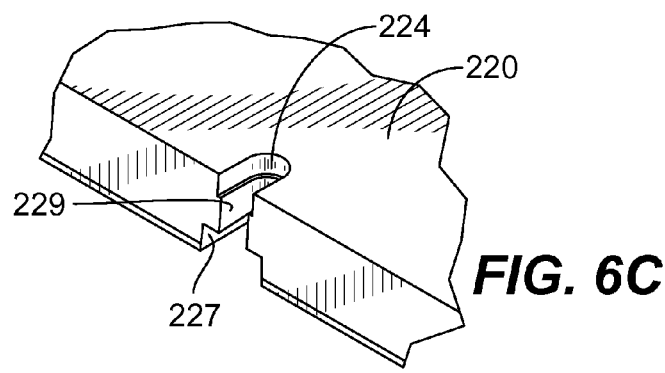
FIG. 6C

UTILITY ENCLOSURE HAVING ATTACHED COVER LATCHING MECHANISM

REFERENCE TO RELATED APPLICATION

The present disclosure is based on and claims benefit from U.S. Provisional Application Ser. No. 62/040,378 filed Aug. 21, 2014 entitled Utility Enclosure Having Attached Cover Latching Mechanism, the entire contents of which are herein incorporated by reference.

BACKGROUND

Technical Field

The present disclosure relates to utility enclosures and, more particularly, to utility enclosures having attached cover latching mechanisms.

Description of the Background Art

Utility companies such as water, electric and/or gas utilities often use subterranean passages or tunnels as conduits. For example, underground electric utilities may run through junction or utility boxes that are buried having covers at grade for workman access. The cover when installed onto the utility box can often endure vehicle and pedestrian traffic. Such covers are often bolted to the subterranean utility enclosure boxes using threaded bolts. Similarly, meters or valves for utilities such as service valves may be installed in a utility box at a street or sidewalk location to provide service to commercial or residential locations and are often placed under a utility cover.

In certain circumstances, the utility cover may be attached to the utility box using a bolt that extends from the cover into the utility box. Generally, such utility cover systems require the bolt to be turned in one direction to open and the opposite direction to lock. Furthermore, the bolt in such systems can be removed from the cover such that the bolt can be readily misplaced or lost. With these systems, there is generally no way to tell whether the cover is locked or unlocked just by looking at the cover. Accordingly, these systems can lead to false belief that the lid is locked when it is actually in the unlocked position.

SUMMARY

A utility enclosure assembly includes a base having at least one receiving latching mechanism and a lid having at least one attached latching mechanism, each at least one attached latching mechanism for operatively engaging a respective one of the at least one receiving latching mechanism.

A utility enclosure assembly includes a base having at least one lock plate and a lid having at least one attached spring biased locking bolt, each at least one attached spring biased locking bolt for operatively engaging a respective one of the at least one lock plate.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 1 is a top, side perspective view of a representative utility enclosure having a cover with attached latching mechanism according to an illustrative embodiment of the present disclosure;

FIG. 2 is a side view of a representative utility enclosure having a cover with attached latching mechanism according to an illustrative embodiment of the present disclosure;

FIG. 3 is a top view of a representative utility enclosure without a cover according to an illustrative embodiment of the present disclosure;

FIG. 4 is a front view of a representative utility enclosure having a cover with attached latching mechanism according to an illustrative embodiment of the present disclosure;

FIG. 5A is a perspective view of a representative utility enclosure box having a lock plate for engaging a cover with attached latching mechanism according to an illustrative embodiment of the present disclosure;

FIG. 5B is an enlarged view of a representative section of the utility enclosure box shown in FIG. 5A according to an embodiment of the present disclosure;

FIG. 6A is a bottom perspective view of a representative utility enclosure box cover for engaging a utility enclosure box according to an embodiment of the present disclosure;

FIG. 6B is a top perspective view of a representative utility enclosure box cover for engaging a utility enclosure box according to an embodiment of the present disclosure;

FIG. 6C is an enlarged view of a representative section of the utility enclosure box cover shown in FIG. 6A according to an embodiment of the present disclosure;

DETAILED DESCRIPTION

Figure 7:
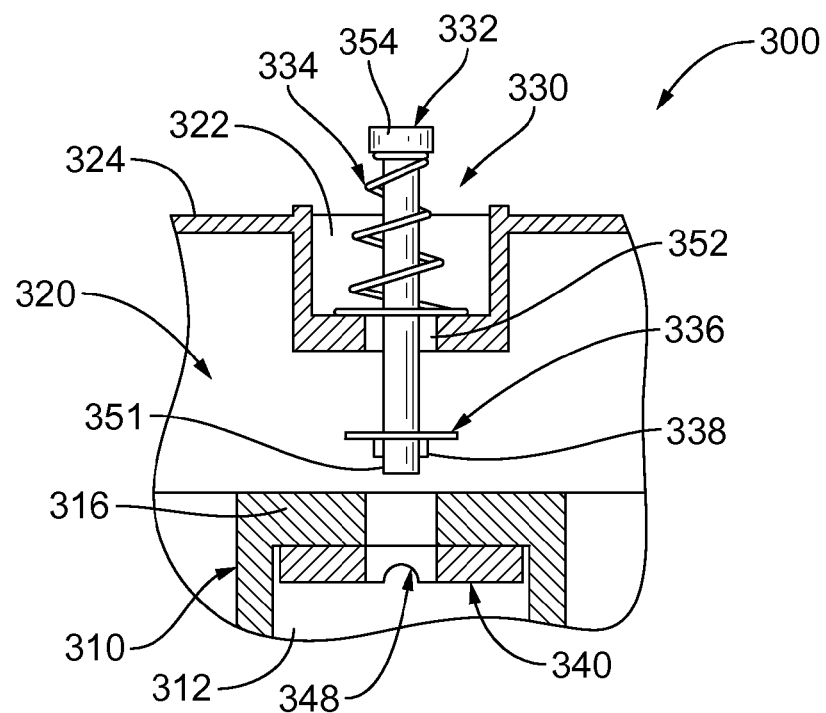
FIG. 7 is a partial cutaway view of a representative utility enclosure box having an attached latching mechanism in an open or unlocked position according to an illustrative embodiment of the present disclosure.

Illustrative embodiments of the present disclosure may be provided as improvements to various types of utility enclosures. For example, a latching mechanism according to an embodiment of the present disclosure may be provided on and attached to a utility enclosure cover that operatively engages a corresponding latching structure in the utility enclosure box.

Illustrative embodiments of the present disclosure provide systems and methods for utility enclosures for avoiding lost cover bolts by providing attached cover latching mechanisms. According to an embodiment of the present disclosure, a latching mechanism is attached on the utility enclosure cover that is not removable and that operatively engages a corresponding latching structure in the utility enclosure box.

According to an embodiment of the present disclosure, a lid or cover attachment system is provided to be used with a utility enclosure. The cover attachment system includes an attached spring biased bolt provided on the cover. According to this embodiment, the latching mechanism is designed so that the spring biased bolt cannot come out, get separated from the cover and get lost. The mechanism is activated with a flat blade screwdriver. When the spring biased bolt is pushed down to compress the spring and then rotated ¼ turn or 90 degrees in either direction, a pin that transverses the spring biased bolt engages with a groove in a locking plate provided in the utility enclosure box. This causes positive latching. To unlock, the bolt head is pressed down and rotated ¼ turn or 90 degrees in either direction. This unlatches the pin from the lock plate and the spring causes the bolt to rise above the cover surface. This aids as an indicator to service personal to know the cover is not locked. If the latching mechanism bolt is in the raised position, then that portion of the cover is unlocked. When the cover is unlocked, it can be readily removed from the utility enclosure box. When locked and engaged, the bolt head sits slightly below the cover surface in a bolt head cavity provided in the cover.

In certain illustrative embodiments described herein, the utility enclosure box and/or cover are constructed from plastic such as high density polyethylene (HDPE). Alternatively, illustrative embodiments may use polymer concrete for the lid and/or box. In the illustrative embodiments described herein, the latching mechanism materials may include stainless steel and spring steel as appropriate. Alternatively, steel, brass, aluminum or other appropriate alloy may be used for the appropriate latching mechanism components. Of course, other types of materials such as plastics, composites, etc. may be used as desired and where appropriate.

In certain embodiments of the present disclosure, the attached locking mechanism is attached to a utility enclosure lid and is provided as a ¼ turn lock mechanism having a spring biased bolt with a bolt locking pin mounted toward the bottom of the bolt. The length of the bolt used may be different depending on which enclosure it is used in. The bolt locking pin transverses the bolt and forms a "T" with the bolt. Illustrative embodiments of the present disclosure function so that a positive locking position is ensured when the pin in the bolt engages with one or more grooves in a lock plate provided in the utility enclosure box. This "T" design ensures the bolt cannot come out of the lid. This "T" design is superior to an "L" shape design that can only turn 90 degrees until it hits against the box wall and cannot turn any further. In addition, "L" latches can unlatch due to heavy vibration. The illustrative embodiments of the present disclosure provide a latching mechanism that may advantageously be rotated ¼ turn or 90 degrees in either direction to engage or disengage. Other inferior designs are turned in one direction to open and the opposite direction to lock. Unfortunately, as described above, these other designs can lead to false belief that the lid is locked when it is in the unlocked position.

Embodiments of the present disclosure as described herein provide numerous useful features. For example, when the lid is removed from the box there is no chance of the bolt coming out of the lid and getting lost. Additionally, when the lid is replaced on the box by the technician in the field, the technician can readily determine visually whether the cover bolt is in the locked position before he leaves.

A representative utility enclosure according to an embodiment of the present disclosure is shown in FIGS. 1-4 and is referred to generally as utility enclosure 100. According to this embodiment of the present disclosure, utility enclosure 100 includes a box 110, a cover 120 and a latching mechanism 130. According to various embodiments, the utility enclosure 100 may be made from one or more of high density polyethylene (HDPE), polymer concrete, etc. Box 110 may include one or more vertical ribs 102 and/or vertical grooves 104 providing added integral support to box 110. According to this embodiment of the present disclosure, side walls 106 of box 110 may be slightly angled as shown to provide additional support and strength to box 110. According to this embodiment, cover 120 includes a cavity 108 in which a lock bolt will be inserted such that the head of the lock bolt will be below the top surface of the cover 120 when the lock bolt is in the locked position.

FIG. 3 depicts a top view of the representative utility enclosure 100 as shown in FIGS. 1, 2 and 4, with cover 120 removed. Box 110 has a generally hollow center 112 that may house, for example, one or more utility meters. Box 110 includes an attached latching mechanism 130 that may include a lock plate mounted to box 110 for engaging a lock bolt attached to the utility cover.

A utility enclosure box according to another embodiment of the present disclosure is shown in FIGS. 5A and 5B and is referred to generally as box 200. Box 200 is generally rectangular in shape and includes a plurality of walls 202. According to an embodiment of the present disclosure, vertical supporting members 208 may be formed along the walls 202 providing additional support to the walls 202. A rim 218 extends around the box 200 along the top edge of walls 202 forming an opening 215 for a cover as will be described later below. The rim 218 may include a ledge 211 upon which the cover will rest. The ledge 211 includes a lock plate 214 that engages a cover with attached latching mechanism as will be described later below. According to an embodiment of the present disclosure, box 200 is made from one or more of high density polyethylene (HDPE), polymer concrete, etc.

A utility box cover according to an embodiment of the present disclosure is shown in FIGS. 6A-6C includes a slot 222 for a locking mechanism and is referred to generally as cover 220. Cover 220 is generally rectangular in shape and is dimensioned to fit within the opening 215 in box 200 and to rest on ledge 211 (see FIG. 5A). The bottom surface of cover 220 may include one or more support ribs 226 as shown in FIG. 6A for providing additional support to cover 220. As depicted in FIG. 6C, slot 222 includes a notched recess or cavity 224 provided along an edge of cover 220 which operatively engages a lock bolt as will be described later below. Recess or cavity 224 is positioned in cover 220 so that it aligns with lock plate 214 in box 200. According to an embodiment of the present disclosure, a ledge 229 extends around the inner periphery of recess 224 for engaging a head of a lock bolt as will be described later below. When in a locked position, the head of the lock bolt will be below the top surface of cover 220. When in an unlocked position, the head of the lock bolt will protrude above the top surface of cover 220. According to this embodiment of the present disclosure, a portion of slot 222 along the side edge of cover 220 is open as shown. According to an alternative embodiment of the present disclosure, slot 222 may instead by closed along the side edge of cover 220 in order to ensure that the lock bolt cannot be removed from cover 220. A lower cavity 227 is slightly larger than recess 224 and is dimensioned for receiving a spring as will be described later below.

A utility enclosure having an attached latching mechanism 330 according to an illustrative embodiment of the present disclosure is shown in FIG. 7 in an open or unlocked position and is referred to generally as utility enclosure 300. According to this embodiment of the present disclosure, a cover 320 has a cavity 322 including an orifice 352 for receiving the bolt 332. As shown, head 354 of the bolt 332 is above the top surface 324 of cover 320 when latching mechanism 330 is in the open or unlocked position. Head 354 may have a slot 356 (see FIG. 8) for receiving a regular flathead screwdriver so that bolt 332 can be turned. Spring 334 biases the bolt 332 in an upward unlocked direction shown in FIG. 7. Box 310 includes a cavity 312 with an upper wall 316. Upper wall 316 has an orifice 350 formed therein which is aligned with orifice 352 in cavity 322 of cover 320 for receiving lock bolt 322. A lock plate 340 may be mounted to upper wall 316 in any appropriate manner including, for example, screws, rivets, plastic weld, glue, etc. According to another embodiment of the present disclosure, lock plate 340 is formed in situ in upper wall 316 during formation of the box 310. A washer 336 is placed over bolt 332 and is maintained on bolt 332 by bolt lock pin 338. Bolt lock pin 338 may be press fit or otherwise mounted inside a hole located near the distal end 351 of bolt 332. Bolt lock pin 338 thus transverses bolt 332 forming a "T" shaped locking mechanism. In the unlocked position shown in FIG. 7, bolt 332 stays attached to cover 320 so that it cannot be misplaced or lost. In addition, in the unlocked position, spring 334 biases bolt 332 so that bolt head 354 is above the top surface of cover 324 so that it is visually discernable whether the cover is in the locked or unlocked position.

Figure 8:
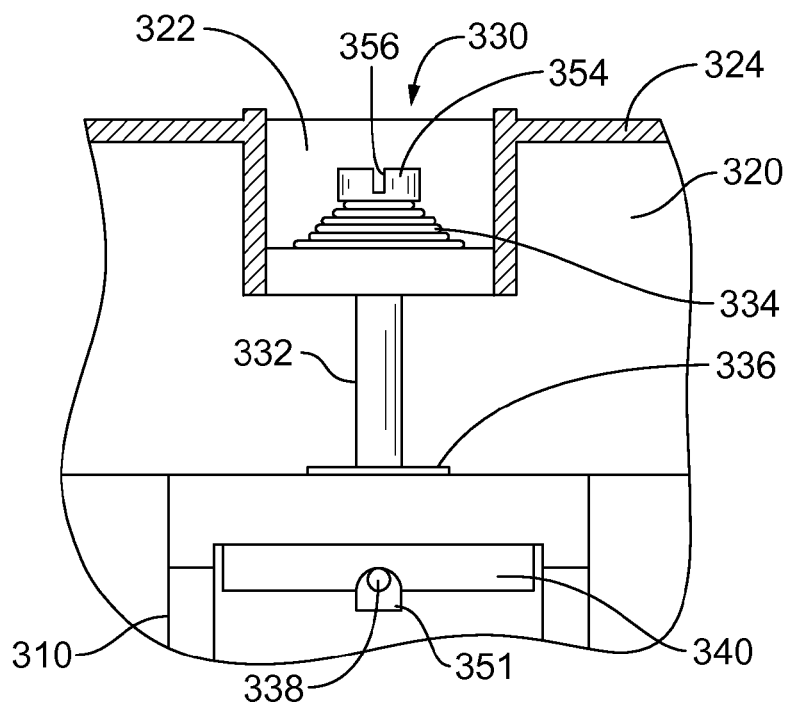
FIG. 8 is a partial cutaway view of a representative utility enclosure box having an attached latching mechanism in a closed or locked position according to an illustrative embodiment of the present disclosure.

To lock cover 320, bolt 332 is pressed in a downward direction against the force of spring 334 until bolt lock pin 338 is just below the lower surface of lock plate 340. Bolt 332 is then rotated ¼ turn such that bolt lock pin 338 engages notches 348 in lock plate 340. This is the locked position and is shown in FIG. 8 A regular flathead screwdriver can be inserted in slot 356 in head 354 of bolt 332 and used to press bolt 332 downward and to rotate bolt 332.

Figure 9:
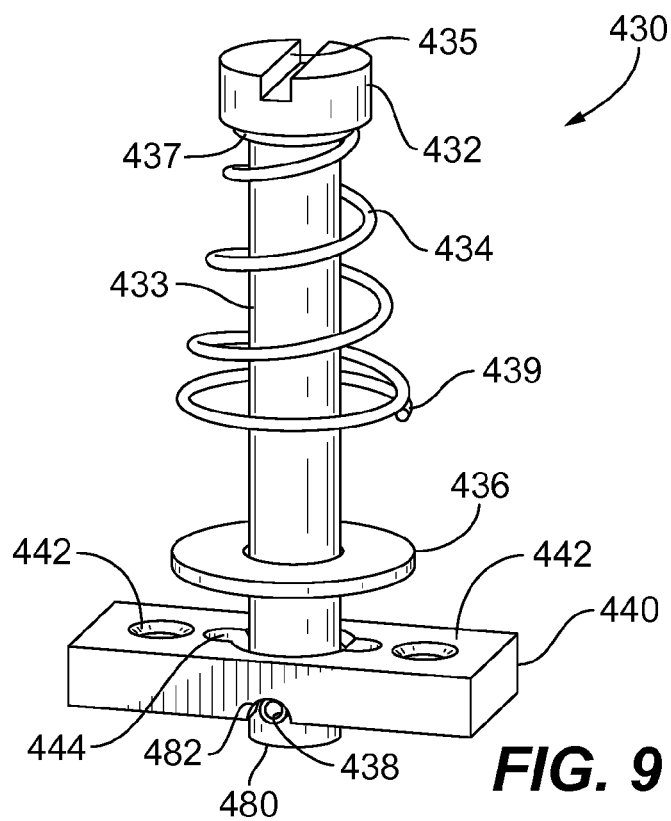
FIG. 9 is a perspective view of a latching mechanism in an unassembled state according to an illustrative embodiment of the present disclosure.

FIG. 9 depicts a latching mechanism 430 according to another embodiment of the present disclosure. Bolt 433 includes a head 432 having a flat head screw driver slot 435. A spring 434 is provided for biasing bolt 433. According to an embodiment of the present disclosure, spring 434 has a first end 437 having a first diameter such that the spring 434 engages head 432 of bolt 433 and a second end 439 having a diameter larger than the first diameter that engages a portion of a cover as will be described later below. A washer 436 is placed over bolt 432 as shown. A bolt lock pin 438 is press fit or otherwise mounted inside a hole toward the end 480 of the bolt 432. Bolt lock pin 438 forms a "T" with bolt 432. A lock plate 440 which is designed to be mounted to a utility box includes mount holes 442 and bolt hole 444. Depending on how lock plate 440 is to be mounted to the utility box, mount holes 442 may or may not be threaded. In the locked position, bolt lock pin 438 rests within notches 482 in lock plate 440.

Figure 10:
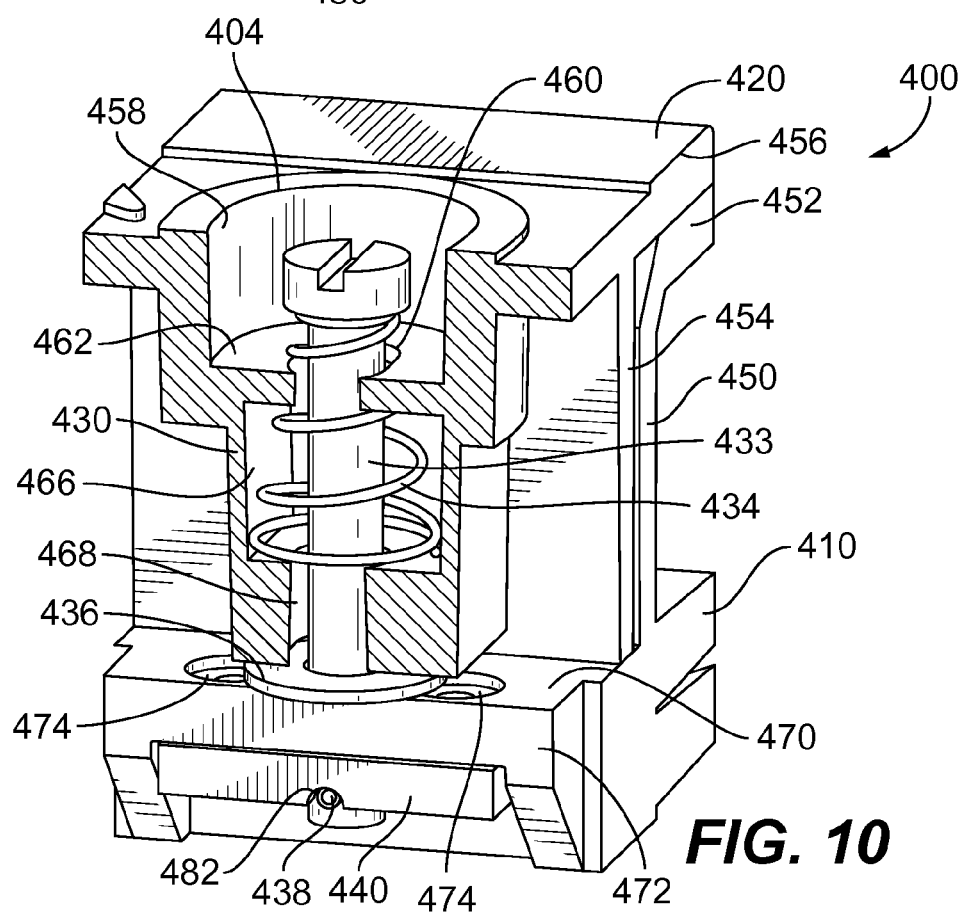
FIG. 10 is a partial cutaway view of a representative utility enclosure having an attached latching mechanism of FIG. 9 in a closed or locked position according to an illustrative embodiment of the present disclosure.

A partial cutaway view of a representative utility enclosure 400 according to an embodiment of the present disclosure is shown in FIG. 10. According to this embodiment, utility enclosure 400 includes a lid or cover 420 with attached latching mechanism 430 similar to that described above with respect to FIG. 9. Utility enclosure 400 also includes a utility box 410. Box 410 includes an upper vertical wall 450 having a vertical ledge 452. Wall 450 and ledge 452 extend around the circumference of the box 410. Cover 420 has a wall 454 extending from its upper surface 456 dimensioned such that cover 420 fits snugly within box 410 as shown. Cover 420 has a latching mechanism receiving opening 404 which includes a cavity 458. A hole 460 is provided in a bottom 462 of cavity 458 dimensioned for receiving bolt 433 and the smaller diameter top portion of spring 434 as shown. A chamber 466 is provided below cavity 458 and is dimensioned to receive the larger diameter lower portion of spring 434. A hole 468 is provided in the bottom of chamber 466 and is dimensioned for receiving bolt 433. Washer 436 sits between an upper surface 470 of box 410 and a lower surface of cover 420 as shown. Washer 436 has an inner diameter smaller than the length of bolt lock pin 438 such that when bolt 433 is in the unlocked position, bolt 433 cannot be removed from cover 420. Box 410 includes a lock plate mounting area 472 extending therefrom and dimensioned to receive lock plate 440. Holes 474 are provided in lock plate mounting area 472 for receiving screws or rivets (not shown) which extend into the holes 442 provided in lock plate 440. Lock plate 440 and lock plate mounting area 472 also include holes through which bolt 433 extends. The lock mechanism is shown in the locked position where bolt lock pin 438 rests in notches 482 in lock plate 440.

Figure 11:
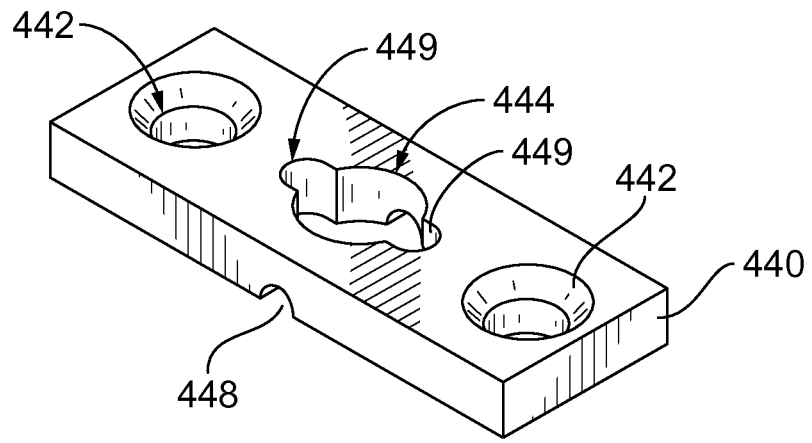
FIG. 11 is a perspective top view of a lock plate according to an illustrative embodiment of the present disclosure.

A lock plate 440 according to an illustrative embodiment of the present disclosure is shown in FIG. 11. Lock plate 440 includes two holes 442, a bolt hole 444 and notch orifices 449 that extend completely through lock plate 440. Holes 442 may have chamfered edges as shown so that a screw or rivet slips easily through holes 442. Bolt hole 444 may also have a chamfered edge if desired so that bolt 433 can slip easily there through. Notch orifices 449 are dimensioned such that bolt 433 and bolt lock pin 438 when aligned therewith slip easily there through. Holes 442 may or may not be threaded, depending on the way lock plate 440 is to be secured to the box.

Figure 12:
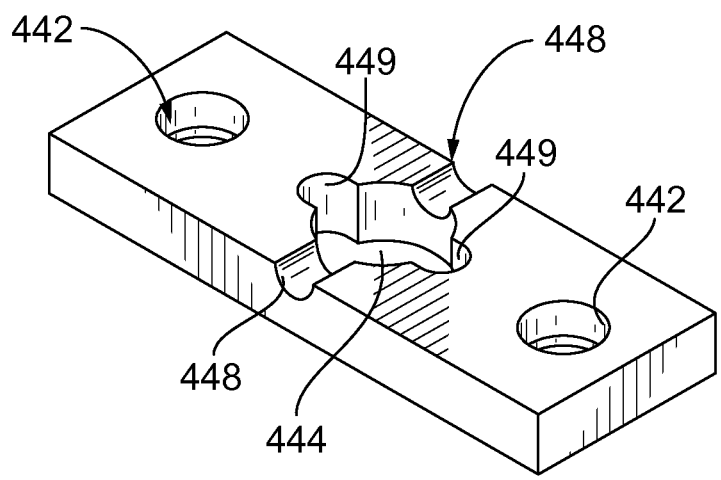
FIG. 12 is a perspective bottom view of a lock plate according to an illustrative embodiment of the present disclosure.

A bottom perspective view of lock plate 440 according to an illustrative embodiment of the present disclosure is shown in FIG. 12. As shown, lock notches 448 are provided for receiving bolt lock pin 438. For example, bolt 433 is inserted in hole 444 with bolt lock pin 438 aligned with notch orifices 449. Bolt 433 is then rotated ¼ turn until bolt lock pin 438 engages lock notches 448.

Figure 13:
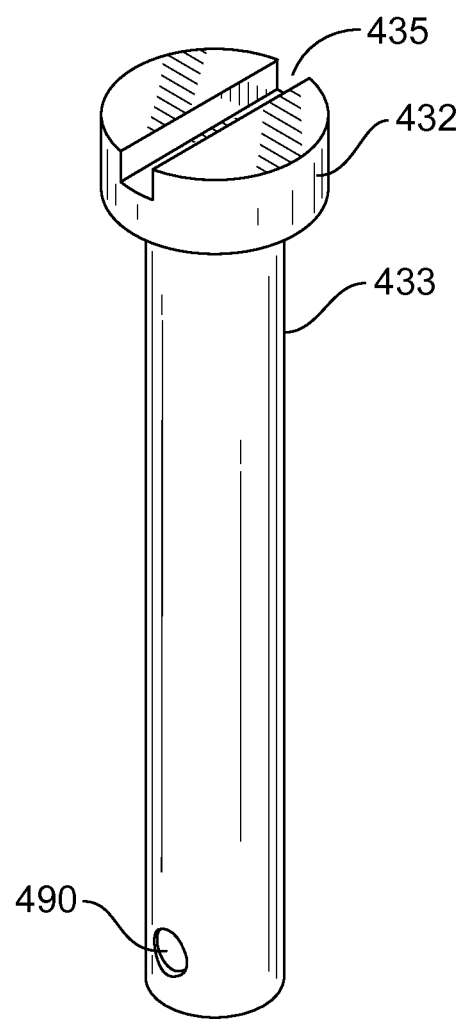
FIG. 13 is a perspective view of a bolt according to an illustrative embodiment of the present disclosure.

FIG. 13 depicts a bolt 433 according to an illustrative embodiment of the present disclosure. A hole 490 extends through bolt 433 for engaging bolt lock pin 438 (e.g., see FIG. 9). Bolt 433 includes a head 432 having a flat headed screwdriver slot 435. Of course, other types of screwdriver slots may be provided in head 432 including, for example, phillips head, TORX® head, ROBERTSON® head, allen head, etc.

As shown throughout the drawings, like reference numerals designate like or corresponding parts. It will be appreciated that although the above-described embodiments show one latching mechanism being provided on a utility enclosure, two or more latching mechanisms may be provided as appropriate.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

We claim:
1. An underground utility enclosure for utility connections, comprising:
  a box capable of being installed under the ground, the box comprising:

a plurality of side walls each having a top edge and a bottom edge, the top edge forming a lid opening, and the top and bottom edges defining an interior center opening, wherein each side wall has a ledge adjacent the top edge, and wherein the lid opening permits access to the interior center opening; and at least one receiving latching mechanism formed in the ledge of at least one of the plurality of side walls; and a removable lid configured to rest on the ledge of each side wall so that the lid is even with the top edge of each side wall, the lid having at least one non-detachable latching mechanism secured to the lid and movable relative to the lid, wherein when the lid is positioned to rest on the ledge of each side wall each at least one non-detachable latching mechanism operatively engages a respective one of the at least one receiving latching mechanism to releasably lock the lid to the box.

2. The utility enclosure of claim 1, wherein the at least one non-detachable latching mechanism comprises a spring biased bolt.

3. The utility enclosure of claim 2, wherein the lid has at least one opening, each opening for receiving a respective spring biased bolt.

4. The utility enclosure of claim 3, wherein the lid has at least one cavity and the at least one opening is provided at a bottom of the at least one cavity.

5. The utility enclosure of claim 2, wherein when in an unlocked position, the spring biased bolt extends above an upper surface of the lid.

6. The utility enclosure of claim 5, wherein when in a locked position, the spring biased bolt does not extend above the upper surface of the lid.

7. The utility enclosure of claim 2, wherein:
each spring biased bolt comprises a locking pin; and
the at least one receiving latching mechanism comprises a locking plate for operatively engaging each locking pin.

8. A utility enclosure assembly comprising:
a box capable of being installed under the ground, the box comprising:
a plurality of side walls each having a top edge and a bottom edge, the top edge forming a lid opening, and the top and bottom edges defining an interior center opening, wherein each side wall has a ledge adjacent the top edge, and wherein the lid opening permits access to the interior center opening; and at least one lock plate attached to the ledge of at least one of the plurality of side walls; and a removable lid configured to rest on the ledge of each side wall so that the lid is even with the top edge of each side wall, the lid having at least one non-detachable spring biased locking bolt secured to the lid and movable relative to the lid, wherein when the lid is positioned to rest on the ledge of each side wall each at least one non-detachable spring biased locking bolt operatively engages a respective one of the at least one lock plate to releasably lock the lid to the box.

9. The utility enclosure of claim 8, wherein the lid has a cavity including a bolt opening through which the non-detachable spring biased locking bolt extends.

10. The utility enclosure of claim 9, wherein the bolt opening aligns with a lock plate opening in the lock plate.

11. The utility enclosure of claim 9, wherein when in an unlocked position, the non-detachable spring biased locking bolt extends above an upper surface of the lid.

12. The utility enclosure of claim 11, wherein when in a locked position, the non-detachable spring biased locking bolt does not extend above the upper surface of the lid.

13. The utility enclosure of claim 8, wherein the least one non-detachable spring biased locking bolt operatively engages a respective one of the at least one lock plate when the attached spring biased locking bolt is rotated ¼ turn.

14. The utility enclosure of claim 8, wherein the non-detachable spring biased locking bolt comprises a T-shaped member.

15. The utility enclosure of claim 14, wherein the T-shaped member operatively engages at least one corresponding notch provided in the lock plate.

16. The utility enclosure of claim 8, wherein the non-detachable spring biased locking bolt comprises a spring having a larger diameter at a first end than at a second end of the spring.

17. The utility enclosure of claim 8, wherein the non-detachable spring biased locking bolt comprises a cylindrical member having a transverse lock pin at one end.

* * * * *